US012673681B2

(12) United States Patent
Seki et al.

(10) Patent No.: US 12,673,681 B2
(45) Date of Patent: Jul. 7, 2026

---

(54) ARITHMETIC DEVICE

(71) Applicant: HONDA MOTOR CO., LTD., Tokyo (JP)

(72) Inventors: Takayuki Seki, Wako (JP); Kazuki Yahata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 17/899,646

(22) Filed: Aug. 31, 2022

(65) Prior Publication Data
US 2023/0075153 A1 Mar. 9, 2023

(30) Foreign Application Priority Data
Sep. 8, 2021 (JP) ................................. 2021-146369

(51) Int. Cl.
*B60W 30/18* (2012.01)
*G06F 9/30* (2018.01)

(52) U.S. Cl.
CPC ..... *B60W 30/18109* (2013.01); *G06F 9/3001* (2013.01); *B60W 2540/22* (2013.01); *B60W 2540/30* (2013.01)

(58) Field of Classification Search
CPC ....... B60W 30/18109; B60W 2540/22; B60W 2540/30; G06F 9/3001
See application file for complete search history.

(56) References Cited

U.S. PATENT DOCUMENTS 9,238,467 B1 * 1/2016 Hoye .................... B60W 50/14
2019/0061811 A1 2/2019 Odate 2019/0202473 A1 7/2019 Kaji et al.
2019/0310633 A1 10/2019 Toyoda
2020/0094828 A1 3/2020 Ohmura et al.
2021/0094529 A1 * 4/2021 Mizoguchi ........ B60W 60/0053
2021/0245769 A1 8/2021 Yamaoka et al.
2022/0084272 A1 * 3/2022 Wang ..................... G06N 3/045
2022/0144310 A1 * 5/2022 Hong ............. B60W 30/18072

(Continued)

FOREIGN PATENT DOCUMENTS

CN 109421794 3/2019
CN 109987099 7/2019

(Continued)

OTHER PUBLICATIONS

Chinese Office Action for Chinese Patent Application No. 202211009445.7 dated Mar. 7, 2025.

*Primary Examiner* — Toya Pettiegrew
(74) *Attorney, Agent, or Firm* — Amin, Turocy & Watson, LLP

(57) ABSTRACT

An arithmetic device includes a first arithmetic chip configured to perform arithmetic processing for realizing driving assistance functions of a vehicle, and a second arithmetic chip configured to perform arithmetic processing for realizing the driving assistance functions of the vehicle, wherein, among the driving assistance functions, second functions realized by the first arithmetic chip along with the second arithmetic chip includes a function of providing at least some of first functions realized without depending on arithmetic processing of the second arithmetic chip in a state in which a task imposed on a driver has been reduced, as compared to the first functions.

6 Claims, 4 Drawing Sheets

(56)　　　　　　References Cited

U.S. PATENT DOCUMENTS

| | | | |
|---|---|---|---|
| 2023/0040552 A1* | 2/2023 | Lee .................. | B60W 50/0098 |
| 2024/0253670 A1* | 8/2024 | Kume .............. | B60W 60/0059 |

FOREIGN PATENT DOCUMENTS

| | | |
|---|---|---|
| CN | 110431057 | 11/2019 |
| CN | 113246993 | 8/2021 |
| JP | 2021-037781 | 3/2021 |

* cited by examiner

ARITHMETIC DEVICE

CROSS-REFERENCE TO RELATED APPLICATION

Priority is claimed on Japanese Patent Application No. 2021-146369, filed Sep. 8, 2021, the content of which is incorporated herein by reference.

BACKGROUND

Field of the Invention

The present invention relates to an arithmetic device.

Description of Related Art

Conventionally, a central arithmetic device included in an in-vehicle network system, in which a main functional unit that realizes a main function including at least driving assistance and an automatic driving arithmetic unit that performs an arithmetic operation for automatic driving are separately configured in different functional blocks is known (Japanese Unexamined Patent Application, First Publication No. 2021-37781).

SUMMARY

In the above-mentioned conventional technology, it may not be possible to clarify division of roles according to classification of functions.

An object of the present invention devised in view of such circumstances is to provide an arithmetic operation device capable of clarifying division of roles according to classification of functions.

An arithmetic device according to the present invention employs the following configuration.

(1): An arithmetic device according to one aspect of the present invention is an arithmetic device including: a first arithmetic chip configured to perform arithmetic processing for realizing driving assistance functions of a vehicle; and a second arithmetic chip configured to perform arithmetic processing for realizing the driving assistance functions of the vehicle, wherein, among the driving assistance functions, second functions realized by the first arithmetic chip along with the second arithmetic chip include a function of providing at least some of first functions realized without depending on arithmetic processing of the second arithmetic chip in a state in which a task imposed on a driver has been reduced, as compared to the first functions.

(2): In the aforementioned aspect of (1), the arithmetic device may further include a third arithmetic chip configured to receive a result of arithmetic processing of the first arithmetic chip and a result of arithmetic processing of the second arithmetic chip and to determine whether or not the driving assistance functions are executable, wherein the third arithmetic chip has a higher functional safety level than the first arithmetic chip and the second arithmetic chip.

(3): In the aforementioned aspect of (1), the first functions may include at least an inter-vehicle distance keeping function, a track keeping function, and a deceleration-for-obstacle function, and the second arithmetic chip may perform arithmetic processing for determining whether or not the task can be reduced.

(4): In the aforementioned aspect of (3), a result of matching between a position of the vehicle and map information may be input to the second arithmetic chip, and the second arithmetic chip may perform arithmetic processing for determining whether or not the task can be reduced on the basis of the matching result.

(5): In the aforementioned aspect of (1), the second arithmetic chip may perform arithmetic processing for alternative control when a driver's physical condition deteriorates or when soundness of a system including the arithmetic device deteriorates.

(6): An arithmetic device according to another aspect of the present invention is an arithmetic device including: a first arithmetic chip configured to perform arithmetic processing for realizing driving assistance functions of a vehicle; and a board on which the first arithmetic chip is mounted, wherein the board is provided with a free area for mounting a second arithmetic chip configured to perform arithmetic processing for realizing the driving assistance functions of the vehicle, the first arithmetic chip realizes first functions among the driving assistance functions without depending on arithmetic processing of the second arithmetic chip, and when the second arithmetic chip is mounted on the board, the first arithmetic chip realizes at least some of the first functions along with the second arithmetic chip in a state in which a task imposed on a driver has been reduced.

According to the aspects (1) to (6), it is possible to classify division of roles according to classification of functions.

DESCRIPTION OF EMBODIMENTS

Hereinafter, embodiments of the arithmetic device of the present invention will be described with reference to the drawings. The arithmetic device is a device that performs an arithmetic operation for driving assistance of a vehicle. Although it is assumed that the arithmetic device is mounted in a vehicle in the following embodiments, the arithmetic device may be provided outside a vehicle and remotely provide a driving assistance function.

Figure 1:
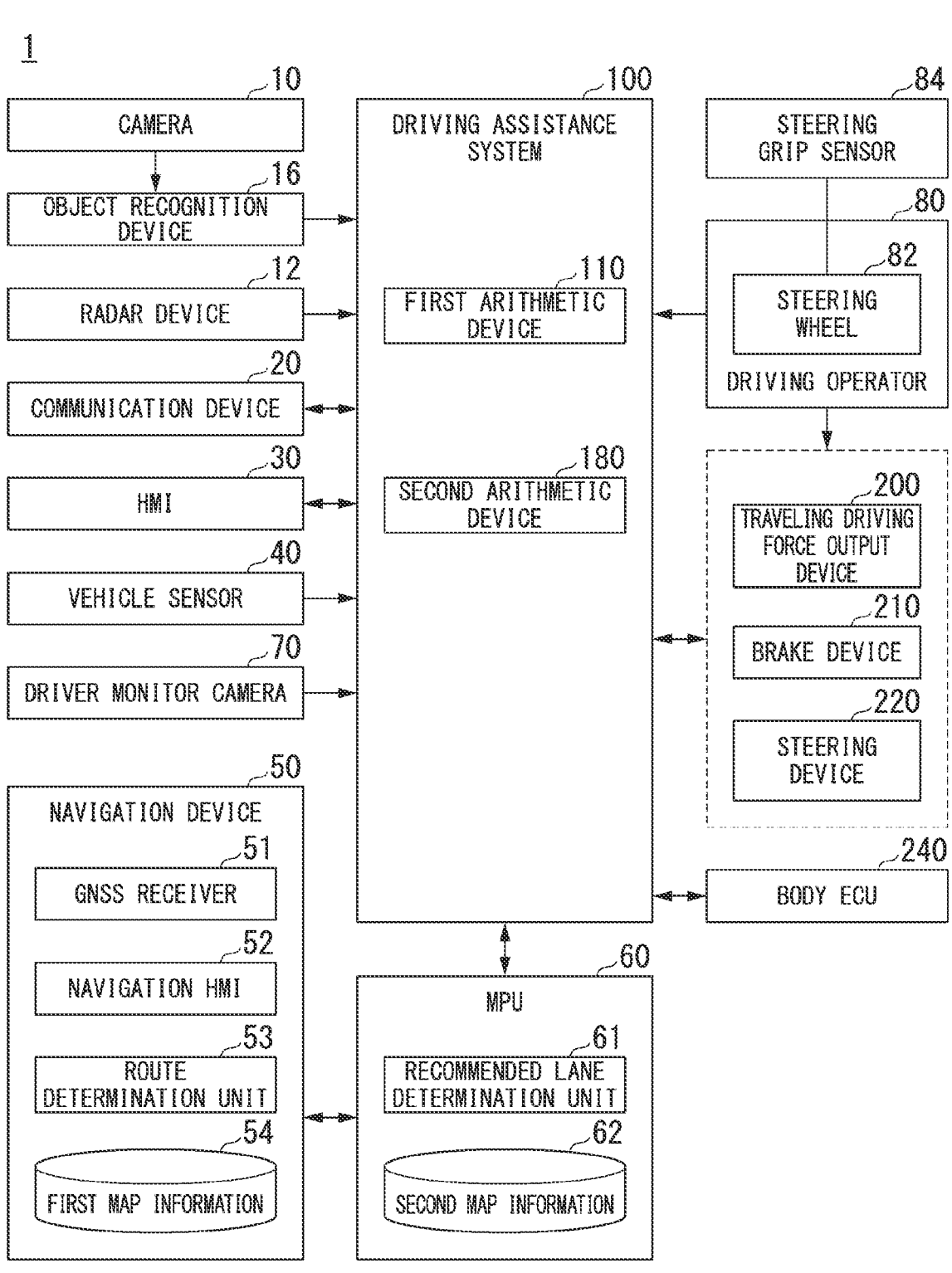
FIG. 1 is a diagram illustrating a driving assistance system using an arithmetic device and an apparatus mounted in a vehicle equipped with the driving assistance system.

FIG. 1 is a diagram illustrating a driving assistance system 100 using the arithmetic device and an apparatus mounted in a vehicle equipped with the driving assistance system 100. The vehicle in which the driving assistance system 100 is mounted (hereinafter referred to as a vehicle M) is, for example, a vehicle such as a two-wheeled vehicle, a three-wheeled vehicle, or a four-wheeled vehicle, and a drive source thereof is an internal combustion engine such as a diesel engine or a gasoline engine, a motor, or a combination thereof. The motor operates using electric power generated by a generator connected to the internal combustion engine or electric power generated by a secondary battery or a fuel cell.

The vehicle M includes, for example, a camera 10, a radar device 12, an object recognition device 16, a communication device 20, a human machine interface (HMI) 30, a vehicle sensor 40, a navigation device 50, a map positioning unit (MPU) 60, a driver monitor camera 70, a driving operator 80, the driving assistance system 100, a traveling driving force output device 200, a brake device 210, a steering device 220, and a body ECU 240. These devices and apparatuses are connected to each other through a multiplex communication line such as a controller area network (CAN) communication line, a serial communication line, a wireless communication network, or the like. The components shown in FIG. 1 are merely an example, and some of the components may be omitted or other components may be added.

The camera 10 is, for example, a digital camera using a solid-state image sensor such as a charge coupled device (CCD) or a complementary metal oxide semiconductor (CMOS). The camera 10 is attached to an arbitrary position in the vehicle M. When a front view image is captured, the camera 10 is attached to the upper part of a front windshield, the back surface of a rear-view mirror, or the like. The camera 10 periodically and repeatedly images the surroundings of the vehicle M, for example. The camera 10 may be a stereo camera.

The radar device 12 radiates radio waves such as millimeter waves around the vehicle M and detects radio waves (reflected waves) reflected by an object to detect at least the position (distance and direction) of the object. The radar device 12 is attached to an arbitrary position in the vehicle M. The radar device 12 may detect the position and speed of an object using a frequency modulated continuous wave (FM-CW) method or the like.

The object recognition device 16 performs preprocessing and the like on an image captured by the camera 10 and outputs the image to the driving assistance system 100.

The communication device 20 communicates with other vehicles around the vehicle M using, for example, a cellular network, a Wi-Fi network, Bluetooth (registered trademark), dedicated short range communication (DSRC), or the like or communicates with various server devices via a wireless base station.

The HMI 30 presents various types of information to an occupant of the vehicle M and receives input operations performed by the occupant. The HMI 30 includes various display devices, speakers, buzzers, touch panels, switches, keys, and the like.

The vehicle sensor 40 includes a vehicle speed sensor that detects the speed of the vehicle M, an acceleration sensor that detects an acceleration, a yaw rate sensor that detects an angular velocity around a vertical axis, a direction sensor that detects the direction of the vehicle M, and the like.

The navigation device 50 includes, for example, a global navigation satellite system (GNSS) receiver 51, a navigation HMI 52, and a route determination unit 53. The navigation device 50 stores first map information 54 in a storage device such as a hard disk drive (HDD) or a flash memory. The GNSS receiver 51 identifies the position of the vehicle M on the basis of signals received from a GNSS satellite. The position of the vehicle M may be identified or complemented by an inertial navigation system (INS) using the output of the vehicle sensor 40. The navigation HMI 52 includes a display device, a speaker, a touch panel, keys, and the like. The navigation HMI 52 may be partially or wholly shared with the above-mentioned HMI 30. The route determination unit 53 determines a route (hereinafter, a route on a map) to a destination input by an occupant using the navigation HMI 52 from the position of the vehicle M identified by the GNSS receiver 51 (or an input arbitrary position) with reference to the first map information 54, for example. The first map information 54 is, for example, information in which a road shape is expressed by links indicating a road and nodes connected by the links. The first map information 54 may include road curvatures, point-of-interest (POI) information, and the like. The route on the map is output to MPU 60. The navigation device 50 may provide route guidance using the navigation HMI 52 on the basis of the route on the map. The navigation device 50 may be realized by, for example, a function of a terminal device such as a smartphone or a tablet terminal carried by an occupant. The navigation device 50 may transmit the current position and the destination to a navigation server via the communication device 20 and acquire a route equivalent to the route on the map from the navigation server.

The MPU 60 includes, for example, a recommended lane determination unit 61 and stores second map information 62 in a storage device such as an HDD or a flash memory. The recommended lane determination unit 61 divides the route on the map provided by the navigation device 50 into a plurality of blocks (for example, divides the route into units of 100 [m] with respect to the vehicle traveling direction) and determines a recommended lane for each block with reference to the second map information 62. The recommended lane determination unit 61 performs determination to determine in which lane from the left the vehicle will travel. When a branch point exists on the route on the map, the recommended lane determination unit 61 determines a recommended lane such that the vehicle M can travel on a reasonable route to proceed to the branch destination.

The second map information 62 is map information with higher accuracy than the first map information 54. The second map information 62 includes, for example, information on the center of a lane, information on the boundary of a lane, and the like. Further, the second map information 62 may include road information, traffic regulation information, address information (addresses/postal codes), facility information, telephone number information, and information on prohibited sections in which mode A or mode B, which will be described later, is prohibited. The second map information 62 may be updated at any time by the communication device 20 communicating with another device.

The driver monitor camera 70 is, for example, a digital camera using a solid-state image sensor such as a CCD or a CMOS. The driver monitor camera 70 is attached to an arbitrary location in the vehicle M at a position in a direction in which the head of an occupant (hereinafter referred to as a driver) seated in the driver's seat of the vehicle M can be imaged from the front (in a direction in which the face is imaged). For example, the driver monitor camera 70 is attached to the upper part of a display device provided in the central part of an instrument panel of the vehicle M.

The driving operator 80 includes, for example, an accelerator pedal, a brake pedal, a shift lever, and other operators in addition to a steering wheel 82. A sensor for detecting the amount of operation or presence or absence of operation is attached to the driving operator 80, and the detection result is output to the driving assistance system 100 or some or all of the traveling driving force output device 200, the brake device 210, and the steering device 220. The steering wheel 82 is an example of an "operator that accepts a steering operation of the driver." The operator does not necessarily have to be annular and may take the form of an alternative form of steering device, a joystick, a button, or the like. A steering grip sensor 84 is attached to the steering wheel 82. The steering grip sensor 84 is realized by a capacitance sensor or the like and outputs a signal capable of detecting whether or not the driver is gripping the steering wheel 82

(meaning that the driver is in contact with the steering wheel 82 and applying force thereto) to the driving assistance system 100.

The driving assistance system 100 includes, for example, a first arithmetic device 110 and a second arithmetic device 180. The configurations and division of functions thereof will be described later.

The traveling driving force output device 200 outputs a traveling driving force (torque) for the vehicle to travel to drive wheels. The traveling driving force output device 200 includes, for example, a combination of an internal combustion engine, a motor, a transmission, and the like, and an electronic control unit (ECU) that controls the same. The ECU controls the aforementioned components according to information input from the second arithmetic device 180 or information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second arithmetic device 180 or information input from the driving operator 80 such that a brake torque corresponding to a braking operation is output to each wheel. The brake device 210 may include a mechanism for transmitting the hydraulic pressure generated by the operation of the brake pedal included in the driving operator 80 to the cylinder via a master cylinder as a backup. The brake device 210 is not limited to the configuration described above and may be an electronically controlled hydraulic brake device that controls an actuator according to information input from the second arithmetic device 180 to transmit the hydraulic pressure of the master cylinder to the cylinder.

The steering device 220 includes, for example, a steering ECU and an electric motor. The electric motor, for example, changes a direction of the steering wheels by causing a force to act on a rack and pinion mechanism. The steering ECU drives the electric motor according to information input from the second arithmetic device 180 or information input from the driving operator 80 to change the direction of the steering wheel.

The body ECU 240 is a control device that controls a direction indicator, a hazard lamp, a brake lamp, a headlight, a horn, wipers, and the like.

First Embodiment

[First Arithmetic Device]

Figure 2:
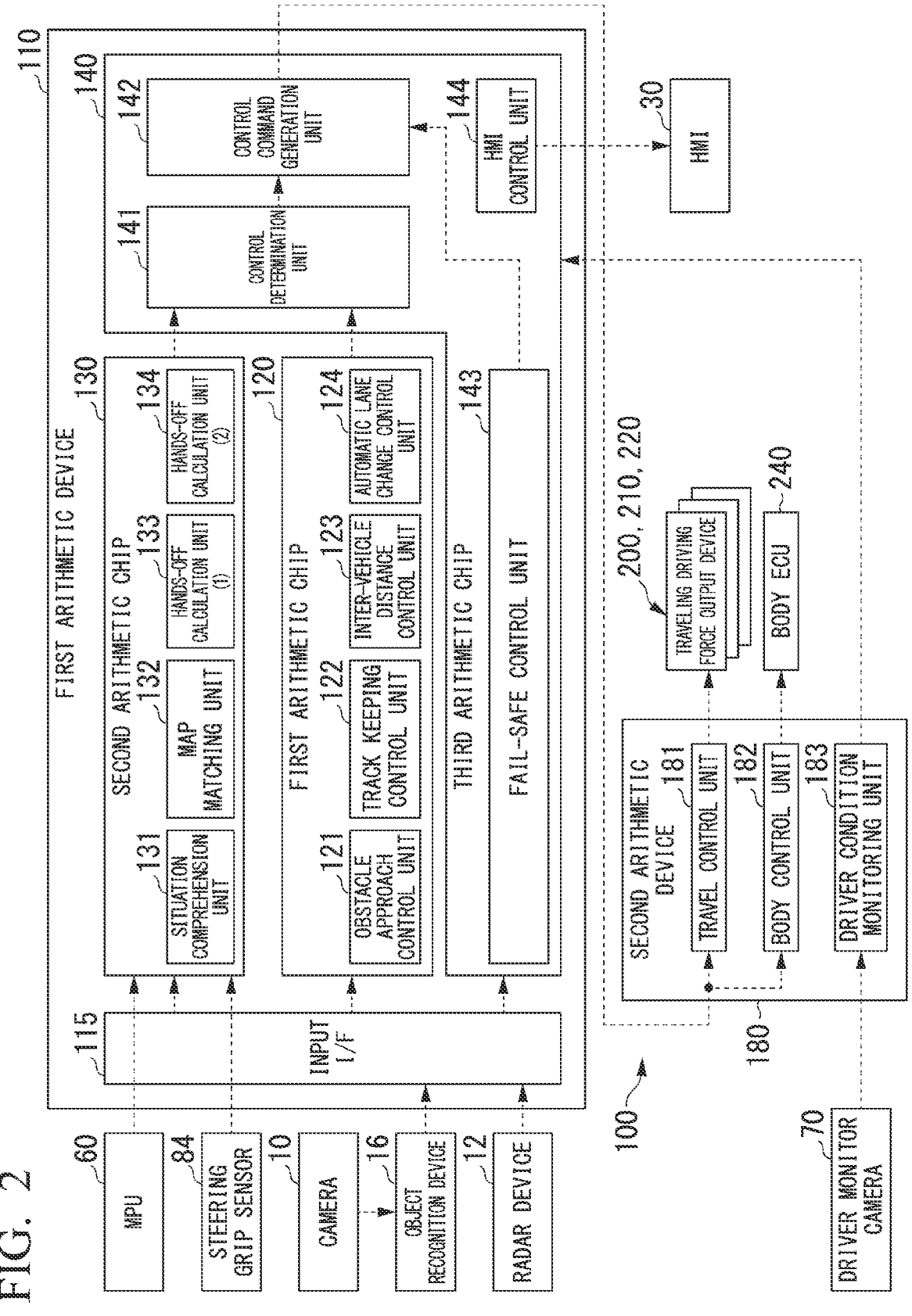
FIG. 2 is a diagram showing an example of a configuration of a driving assistance system according to a first embodiment.

FIG. 2 is a diagram showing an example of a configuration of the driving assistance system 100 according to a first embodiment. The first arithmetic device 110 includes, for example, an input interface (I/F) 115, a first arithmetic chip 120, a second arithmetic chip 130, and a third arithmetic chip 140. Each of the first arithmetic chip 120 and the second arithmetic chip 130 is, for example, a multi-core processor having a predetermined number of CPU cores. As an example, each of the first arithmetic chip 120 and the second arithmetic chip 130 has four CPU cores. Each of the first arithmetic chip 120 and the second arithmetic chip 130 has a core-to-core communication function and performs various types of processing using a hierarchical cache memory.

[First Arithmetic Chip]

Each of the four CPU cores of the first arithmetic chip 120 functions as an obstacle approach control unit 121, a track keeping control unit 122, an inter-vehicle distance control unit 123, and an automatic lane change control unit 124 by executing programs. The programs are stored in, for example, a program memory common to the four CPU cores of the first arithmetic chip 120. The programs may be stored in a program memory corresponding to each of the four CPU cores of the first arithmetic chip 120.

Each of the obstacle approach control unit 121, the track keeping control unit 122, the inter-vehicle distance control unit 123, and the automatic lane change control unit 124 realizes first functions that can be executed without depending on arithmetic processing of the second arithmetic chip 130. Each of the first functions is instructed to be activated by an operation of the driver performed on the HMI 30. Each of the first functions is a function having a lower degree of automation than second functions realized by the first arithmetic chip 120 along with the second arithmetic chip 130. A low degree of automation means that the range of control coverage is narrower and thus tasks assigned to the driver are relatively high. Further, the second functions realized by the first arithmetic chip 120 along with the second arithmetic chip 130 include a function of providing at least some of the first functions in a state in which tasks assigned to the driver have been reduced as compared to the first functions realized without depending on arithmetic processing of the second arithmetic chip 130.

As one of the first functions, the obstacle approach control unit 121 performs control to decelerate or stop the vehicle M according to approach to an obstacle. Obstacles include traffic participants such as vehicles and pedestrians, and stationary objects such as utility poles, stopped vehicles, and falling objects. The obstacle approach control unit 121 generates a control command for outputting a large braking force to the brake device 210 as a time to collision (TTC) with an obstacle present on the side of the traveling direction of the vehicle M decreases and outputs the control command to the third arithmetic chip 140.

As another function of the first functions, the track keeping control unit 122 performs control to instruct the steering device 220 to automatically output a steering force such that the vehicle M does not deviate from a track, or a steering motor (not shown) is used or to cause a steering motor which is not shown to output a reaction force to the operation of the steering wheel 82. Although a track is an area defined by road lane markings such as white lines, the track keeping control unit 122 may recognize a track on the basis of the position of a road shoulder, a road edge, a difference in level, or the like when road lane markings cannot be recognized. The track keeping control unit 122 generates a control command for guiding the vehicle M to a side opposite to a deviation direction in response to deviation of a reference position of the vehicle M (for example, the center of the front end, the center of gravity, the center of the rear wheel axle, or the like) from the center position of the track and outputs the control command to the third arithmetic chip 140.

As another function of the first functions, the inter-vehicle distance control unit 123 performs speed control for maintaining an inter-vehicle distance from a preceding vehicle of the vehicle M at a target inter-vehicle distance. The preceding vehicle is a vehicle that is traveling in the same lane as the vehicle M in the same direction, is present in front of the vehicle M, and between the vehicle M and which there are no other vehicles. The target inter-vehicle distance is set by, for example, an occupant such as a driver. Further, when a preceding vehicle is not present in a detection range of the camera 10 or the radar device 12 or when a preceding vehicle is present but at a position farther than a specified distance, the inter-vehicle distance control unit 123 may perform control to simply maintain the speed of the vehicle M at a target speed.

As another function of the first functions, the automatic lane change control unit 124 performs steering and speed control for causing the vehicle M to automatedly change lanes in response to a driver's operation (for example, an operation on a winker lever). When the speed of a preceding vehicle is lower than a threshold value with respect to the speed of the vehicle M, the automatic lane change control unit 124 may perform lane change twice (change lanes to a different lane from the lane in which the preceding vehicle is traveling, and after traveling sufficiently ahead of the preceding vehicle, return to the original lane) to pass the preceding vehicle.

[Second Arithmetic Chip]

Each of the four CPU cores of the second arithmetic chip 130 functions as a situation comprehension unit 131, a map matching unit 132, a hands-off calculation unit (1) 133, and a hands-off calculation unit (2) 134 by executing programs. The programs are stored in, for example, a program memory common to the four CPU cores of the second arithmetic chip 130. The programs may be stored in a program memory corresponding to each of the four CPU cores of the second arithmetic chip 130.

As described above, the second functions realized by the first arithmetic chip 120 along with the second arithmetic chip 130 include a function of providing at least some of the first functions in a state in which a task imposed on the driver has been reduced as compared to the first functions. The state in which a task imposed on the driver has been reduced is, for example, a state in which the steering wheel 82 is not gripped. Gripping means not only simply touching but also applying force to a degree to which the steering wheel 82 can be operated quickly. As an example, the second functions are functions of providing some of all of the first functions in a state in which the driver does not grip the steering wheel 82.

Here, the second functions are not executed unconditionally and are executed after the third arithmetic chip 140 determines whether or not it can be executed. Each part of the second arithmetic chip 130 performs arithmetic processing for generating data used to determine whether or not the second arithmetic chip 130 can be executed.

The situation comprehension unit 131 performs image processing on an image input from the object recognition device 16 and recognizes the positions, types, speeds, and the like of objects. Objects include traffic participants such as vehicles and pedestrians, stationary objects such as utility poles and stopped vehicles, and falling objects, and road lane markings such as white lines. Then, the situation comprehension unit 131 determines whether or not a track (for example, an area defined by road lane markings) can be recognized with sufficient accuracy in the aforementioned processing. For example, the situation comprehension unit 131 monitors the reliability of image processing, and the like in time series and outputs a result of determining whether or not the track can be recognized to the third arithmetic chip 140. The function of performing image processing on an image to recognize the positions, types, speeds, and the like of objects may be a function of the object recognition device 16. In this case, the situation comprehension unit 131 may determine whether or not the track (road lane marking) can be recognized with sufficient accuracy in image processing of the object recognition device 16.

The map matching unit 132 identifies the position of the vehicle M in the second map information 62 on the basis of information input from the MPU 60 and outputs information representing the identified position and the type of the road on which the vehicle M is present to the third arithmetic chip 140. The map matching unit 132 may replace the function of the MPU 60. In such a case, the MPU 60 may not be mounted in the vehicle M. Further, the map matching unit 132 may output information on the position of the track recognized by the situation comprehension unit 131 to the MPU 60 and acquire a result of identifying the position of the vehicle M in the second map information 62 in the MPU 60 from the MPU 60.

The hands-off calculation unit (1) 133 and the hands-off calculation unit (2) 134 generate other data serving as materials for determining whether or not driving assistance is possible without the driver holding the steering wheel 82 and output the data to the third arithmetic chip 140. For example, the hands-off calculation unit (1) 133 or the hands-off calculation unit (2) 134 monitors the output value of the steering grip sensor 84, generates data indicating whether or not the driver grips the steering wheel 82 on the basis of change in the output value, and outputs the data to the third arithmetic chip 140.

[Third Arithmetic Chip]

The third arithmetic chip 140 is configured as hardware having a higher functional safety level than the first arithmetic chip 120 and the second arithmetic chip 130. "High functional safety level" means that, for example, an automotive safety integrity level (ASIL) represented by four stages of A, B, C and D is close to D.

The third arithmetic chip 140 has an arbitrary processor configuration. The third arithmetic chip 140 includes a control determination unit 141, a control command generation unit 142, a fail-safe control unit 143, and an HMI control unit 144 as functional components realized by a processor executing a program stored in a program memory.

The control determination unit 141 determines whether to provide a control command generated by each unit of the first arithmetic chip 120 as a first function or a second function on the basis of data generated by the second arithmetic chip 130 and information input from a driver condition monitoring unit 183 of the second arithmetic device 180.

The control command generation unit 142 changes the control command generated by each unit of the first arithmetic chip 120 into a format to be transmitted to the second arithmetic device 180 and transmits the control command to the second arithmetic device 180.

The fail-safe control unit 143 performs arithmetic processing for alternative control when the driver's physical condition deteriorates or when the soundness of the system including the first arithmetic device 110 deteriorates. The fail-safe control unit 143 detects driver's physical condition deterioration on the basis of information input from the driver condition monitoring unit 183. Further, the fail-safe control unit 143 detects deterioration of the soundness of the system on the basis of self-diagnosis results and the like input from each unit of the system including the first arithmetic device 110 (for example, including some or all of the camera 10, the radar device 12, the object recognition device 16, and the second arithmetic device 180 in addition to the first arithmetic device 110). The fail-safe control unit 143 performs, as alternative control, deceleration of the vehicle M such that the vehicle M stops in a marginal area such as a road shoulder if possible in addition to emergency call and hazard lamp lighting. The control command generation unit 142 also generates control commands for such various behaviors of the vehicle M.

The HMI control unit 144 controls the HMI 30 such that the HMI 30 notifies the driver of information at a timing of switching from a state in which a second function can be provided to a state in which only a first function can be provided. For example, when the determination result of the control determination unit 141 is switching to "second function cannot be provided," the HMI 30 is caused to notify the driver that "please hold the steering wheel" or the like. On the contrary, the HMI control unit 144 causes the HMI 30 to notify the driver of information indicating that the steering wheel may be released when a state in which only the first function can be provided changes to a state in which the second function can be provided.

[Second Arithmetic Device]

The second arithmetic device 180 has an arbitrary processor configuration. The functional safety level of the second arithmetic device 180 may be lower than that of the third arithmetic chip 140. The second arithmetic device 180 includes a travel control unit 181, a body control unit 182, and the driver condition monitoring unit 183 as functional components realized by a processor executing a program stored in a program memory.

The travel control unit 181 controls the traveling driving force output device 200, the brake device 210, and the steering device 220 individually or integrally on the basis of a control command received from the control command generation unit 142.

The body control unit 182 transmits a control command for controlling a direction indicator, a hazard lamp, a brake lamp, a headlight, a horn, wipers, or the like to the body ECU 240 according to a function provided by the driving assistance system.

The driver condition monitoring unit 183 monitors the driver's condition and determines whether or not the driver's condition is a condition according to a task. For example, the driver condition monitoring unit 183 analyzes an image captured by the driver monitor camera 70 to perform line-of-sight estimation processing and determines whether or not the driver is monitoring the front. Further, the driver condition monitoring unit 183 analyzes an image captured by the driver monitor camera 70 to perform posture estimation processing and determines whether or not the driver is in a position where he/she cannot change to a manual driving in response to a request from the system.

[State Change]

Figure 3:
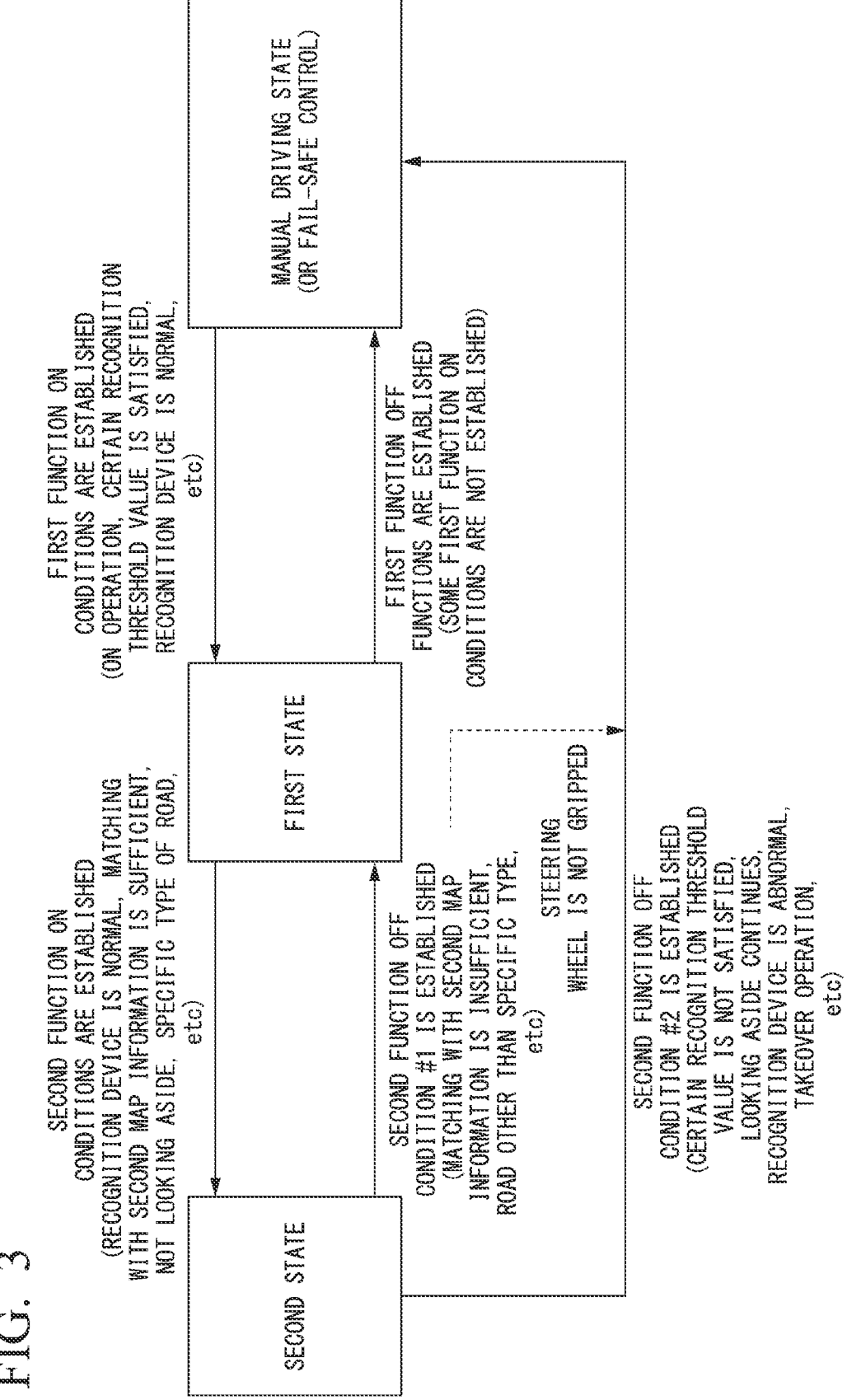
FIG. 3 is a diagram showing an example of state change in a first arithmetic device according to the first embodiment.

FIG. 3 is a diagram showing an example of state change in the first arithmetic device 110 of an embodiment. When the system power of the vehicle M is turned on, the first arithmetic device 110 is in a state in which neither the first functions nor the second functions are provided (hereinafter referred to as a manual driving state). When first function on conditions are established in the manual driving state, provision of the first functions is started according to determination of the control determination unit 141. The first function on conditions include, as AND conditions, a condition in which a first function on operation has been performed by an occupant, a condition in which index values with respect to a recognized distance and reliability satisfy a certain recognition threshold, a condition in which the camera 10, the radar device 12, and the object recognition device 16 (recognition devices) are not in an abnormal state, and the like, for example.

When first function off conditions are established in a state in which the first functions are provided (hereinafter, a first state), provision of the first functions is terminated according to determination of the control determination unit 141, and transition to the manual driving state occurs. The first function off conditions include, as OR conditions, a condition in which a first function off operation has been performed by an occupant, a condition in which the index values with respect to a recognized distance and reliability do not meet the certain recognition threshold value, a condition in which the camera 10, the radar device 12, and the object recognition device 16 are abnormal, and the like, for example.

When second function on conditions are established in the first state, provision of the second functions is started according to determination of the control determination unit 141. The second function on conditions include, as AND conditions, a condition in which the camera 10, the radar device 12, and the object recognition device 16 are not in an abnormal state, a condition in which the second map information 62 and the position of the vehicle M sufficiently match, a condition in which the driver is monitoring the front of the vehicle M (does not look aside), a condition in which the vehicle M is traveling on a specific type of road, such as an expressway or a motorway, and the like, for example.

When second function off conditions are established in a state in which the second functions are provided (hereinafter, a second state), the state is changed to the first state or the manual driving state according to determination of the control determination unit 141. Second function off condition #1 for changing from the second state to the first state includes, OR conditions, a condition in which the second map information 62 and the position of the vehicle M do not sufficiently match, a condition in which the vehicle M has exited from a specific type of road, such as an expressway or a motorway, for example.

Second function off condition #2 for changing from the second state to the manual driving state includes, for example, a condition in which index values with respect to a recognized distance and reliability do not satisfy a certain recognition threshold, a condition in which the driver is not monitoring the front of the vehicle M (looking aside), a condition in which the driver has continued to look aside for a predetermined time even though the HMI control unit 144 urged the driver to monitor the front using the HMI 30, a condition in which the camera 10, the radar device 12, and the object recognition device 16 are abnormal, a condition in which a takeover operation has been performed by the driver, and the like. In this case, fail-safe control may be performed instead of simply switching to the manual driving state.

If the HMI control unit 144 urges the driver to grip the steering wheel 82 using the HMI 30, but the driver does not grip the steering wheel 82 for a predetermined time in spite of it when second function off condition #1 is established, the state may switch to the manual driving state instead of the first state, or fail-safe control may be performed.

Since such complicated situation determination is intensively performed in the third arithmetic chip 140 having a high functional safety level, high reliability of driving assistance can be maintained.

According to the first embodiment described above, it is possible to clarify division of roles according to classification of functions because the first arithmetic chip 120 and the second arithmetic chip 130 for performing arithmetic processing for realizing the driving assistance functions of the vehicle M are provided, and the second functions realized by the first arithmetic chip 120 along with the second arithmetic chip 130 among the driving assistance functions include a function of providing at least some of the first functions in a state in which a task imposed on the driver has been reduced as compared to the first functions realized without depending on arithmetic processing of the second arithmetic chip 130.

Second Embodiment

Figure 4:
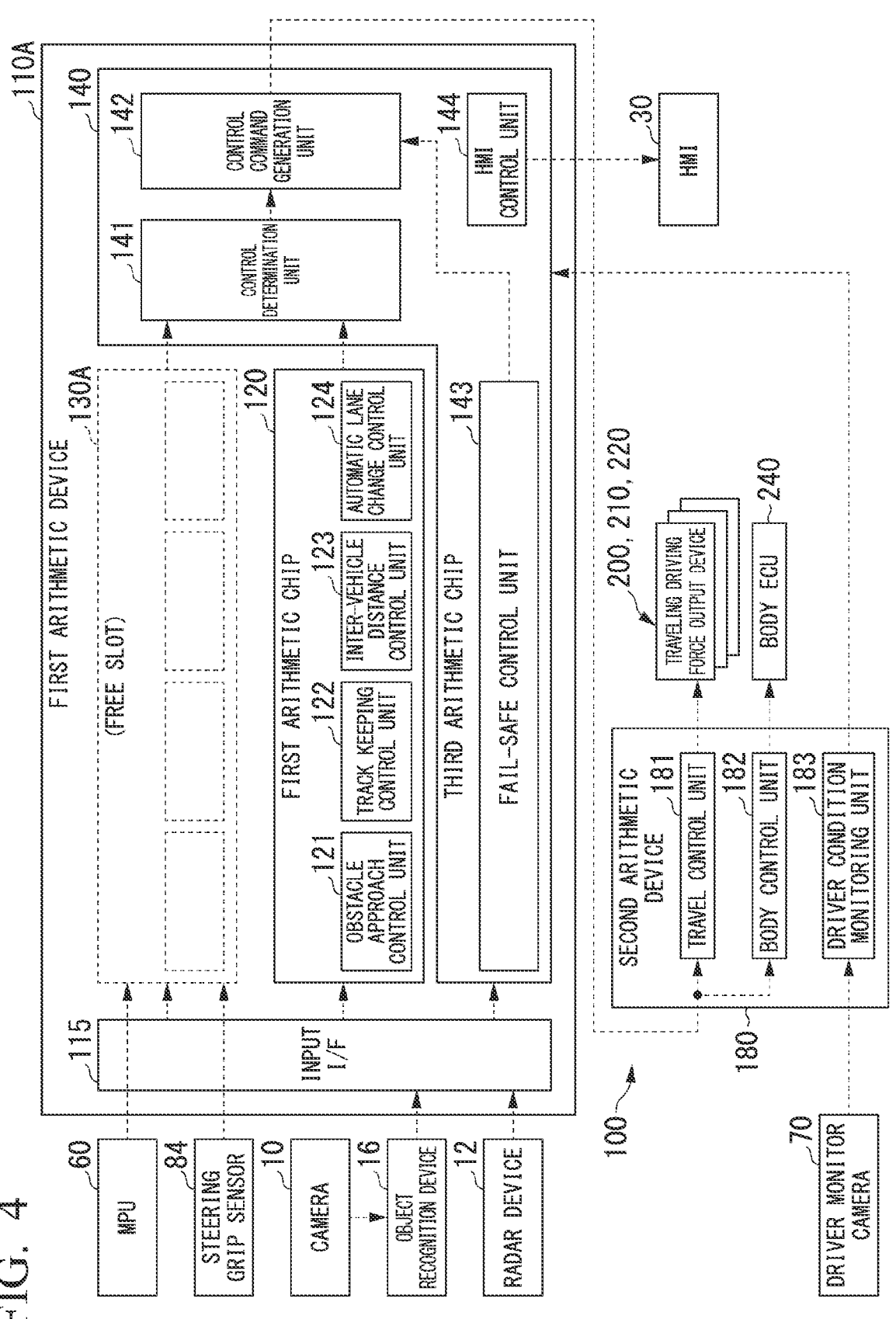
FIG. 4 is a diagram showing an example of a configuration of a driving assistance system according to a second embodiment.

Hereinafter, a second embodiment will be described. FIG. 4 is a diagram showing an example of a configuration of a driving assistance system 100A according to the second embodiment. The driving assistance system of the second embodiment is mounted in a vehicle of a lower grade than that of the first embodiment and does not include the second arithmetic chip 130 as compared to the first embodiment. However, a free area (free slot) 130A for mounting the second arithmetic chip 130 is secured on the board of the first arithmetic device 110 such that the second arithmetic chip 130 can be additionally mounted as an option or after delivery.

According to such a configuration, the same function as that of the first embodiment can be easily realized by additionally mounting the second arithmetic chip 130. Therefore, parts can be shared between a low-grade vehicle and a high-grade vehicle and manufacturing costs can be reduced.

Although the embodiments for carrying out the present invention have been described above using the embodiments, the present invention is not limited to these embodiments and various modifications and substitutions can be made without departing from the spirit or scope of the present invention.

What is claimed is:

1. An arithmetic device comprising:

a first arithmetic chip, comprising a first group of processors, configured to execute instructions to perform first arithmetic processing for providing driving assistance functions of a vehicle; and a second arithmetic chip, comprising a second group of processors, configured to execute instructions to perform second arithmetic processing for providing the driving assistance functions of the vehicle, a board on which the first arithmetic chip is mounted and that is provided with a free area for mounting the second arithmetic chip, wherein, the driving assistance functions include first functions and second functions, the first functions are functions provided in a first state in which the steering wheel is being gripped by a driver and provided by the first arithmetic processing of the first arithmetic chip without the second arithmetic processing of the second arithmetic chip, the second functions are functions provided in a second state in which the steering wheel is not being gripped by the driver and provided by the first arithmetic processing of the first arithmetic chip and the second arithmetic processing of the second arithmetic chip, the second functions including a function of providing at least one function of the first functions in a state in which a task imposed on a driver has been reduced as compared to the first functions, the first functions are provided by the first arithmetic chip in a third state in which the second arithmetic chip is not mounted in the free area, the second functions are provided by both the second arithmetic chip and the first arithmetic chip in a third state in which the second arithmetic chip is mounted in the free area, and controlling at least a speed or a steering force of the vehicle based on at least one function of the first functions or the second functions.

2. The arithmetic device according to claim 1, further comprising a third arithmetic chip, comprising at least one processor, configured to receive a result of the first arithmetic processing of the first arithmetic chip and a result of the second arithmetic processing of the second arithmetic chip and to determine whether or not the driving assistance functions are executable, wherein the third arithmetic chip has a higher functional safety level than the first arithmetic chip and the second arithmetic chip.

3. The arithmetic device according to claim 1, wherein the first functions include at least an inter-vehicle distance keeping function, a track keeping function, and a deceleration-for-obstacle function, and the second arithmetic chip performs the second arithmetic processing for determining whether or not the task can be reduced.

4. The arithmetic device according to claim 3, wherein a result of matching between a position of the vehicle and map information is input to the second arithmetic chip, and the second arithmetic chip performs the second arithmetic processing for determining whether or not the task can be reduced on the basis of the matching result.

5. The arithmetic device according to claim 1, wherein the second arithmetic chip performs the second arithmetic processing for alternative control when a driver's physical condition deteriorates or when soundness of a system including the arithmetic device deteriorates.

6. An arithmetic device comprising:

a first arithmetic chip, representing a first multi-core processor, configured to execute instructions to perform first arithmetic processing for providing driving assistance functions of a vehicle; and a board on which the first arithmetic chip is mounted, wherein the board is provided with a free area for mounting a second arithmetic chip, representing a second multi-core processor, configured to perform second arithmetic processing for providing the driving assistance functions of the vehicle, wherein, the driving assistance functions include first functions and second functions, the first functions are functions provided in a first state in which the steering wheel is being gripped by a driver and provided by the first arithmetic processing of the first arithmetic chip without the second arithmetic processing of the second arithmetic chip, the second functions are functions provided in a second state in which the steering wheel is not being gripped by the driver and provided by the first arithmetic processing of the first arithmetic chip and the second arithmetic processing of the second arithmetic chip when the second arithmetic chip is mounted in the free area on the board, the second functions include a function of providing at least one function of the first functions in a state in which a task is imposed on a driver has been reduced as compared to the first function, the first functions are provided by the first arithmetic chip in a third state in which the second arithmetic chip is not mounted in the free area, the second functions are provided by both the second arithmetic chip and the first arithmetic chip in a third state in which the second arithmetic chip is mounted in the free area, and controlling at least a speed or a steering force of the vehicle based on at least one function of the first functions or the second functions.

* * * * *